April 20, 1965   D. R. BURTON ETAL   3,179,327
FILM TEAR LINE
Filed May 24, 1962
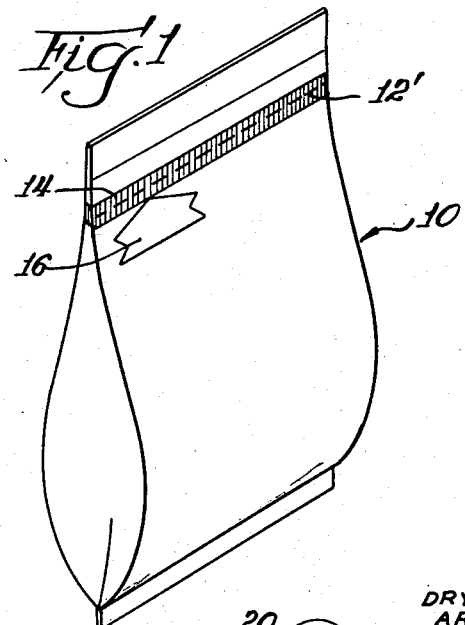
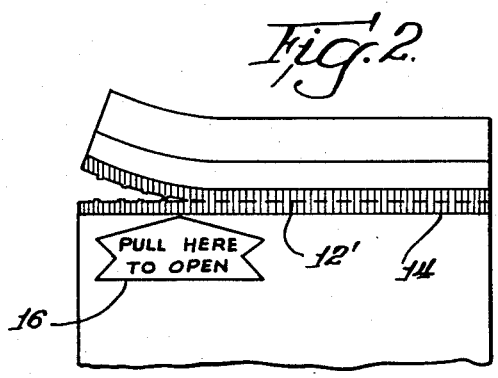
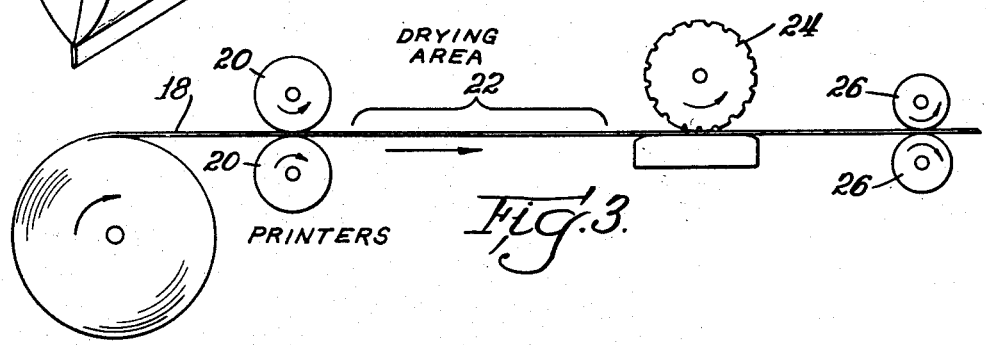
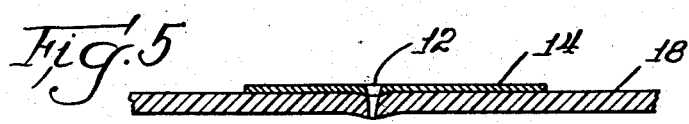
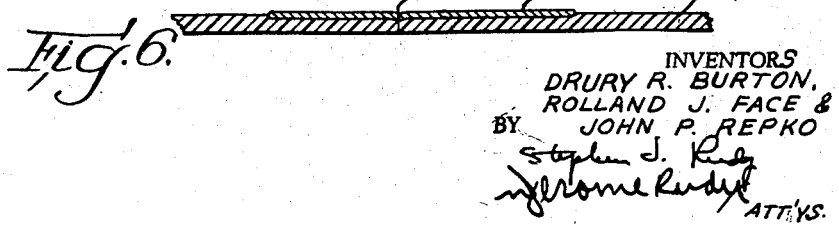
INVENTORS
DRURY R. BURTON,
ROLLAND J. FACE &
BY   JOHN P. REPKO
ATT'YS.

3,179,327
FILM TEAR LINE

Drury R. Burton, Bay Village, Rolland J. Face, Cleveland, and John P. Repko, Parma, Ohio, assignors to The Dow Chemical Company, Midland, Mich., a corporation of Delaware Filed May 24, 1962, Ser. No. 197,490
2 Claims. (Cl. 229—66)

This invention relates to an improved tear line for plastic film material, and a method for making such a tear line.

In the packaging art, the use of plastic film, such as polyethylene, to form an enclosure, has become rather common. One of the problems associated with the use of such material, has been the difficulty in providing a satisfactory means for opening the bag. Various means have been proposed and used with varying degrees of success.

The tear line of the present invention represents an improvement in a serrated type of tear line, as applied to plastic films. More particularly, the tear line of the present invention avoids destruction of the air-tight quality of a plastic film, while still providing a weakened portion which allows convenient tearing in a predetermined straight line. Such a joint feature differs from similar tear lines used on plastic film of the prior art. In addition, the tear line of the present invention is located in a colored area which is easily discernible so that the film may be easily torn, as required for opening of the receptacle. The colored area serves a dual function insofar as it is utilized to assist in the finish treatment of the serrated tear line.

The main object of this invention is to provide an improved tear line for a plastic film material.

A more specific object is to provide a serrated tear line in a plastic film which tear line is processed so that it does not destroy the air-tightness of the film, or, more particularly, a bag made therefrom.

Another object is to provide a tear line which is easily discernible so that the tear line may be conveniently located.

These and further objects and features of the invention will become more apparent from the following description and accompanying drawing wherein:

FIG. 1 is a perspective-like view of a plastic bag embodying the principles of the invention;

FIG. 2 is a side view of the bag of FIG. 1 illustrating the manner in which an end portion thereof may be removed;

FIG. 3 is a schematic illustration of apparatus which may be used in practicing the invention;

FIG. 4 is an enlarged section view taken through material used in the bag of FIG. 1, prior to a serrating operation;

FIG. 5 is the same after a serrating operation; and

FIG. 6 is the same as FIG. 5, after a rolling operation.

Referring now to the drawing, numeral 10 identifies a receptacle, or bag made from polymeric film which is sealed, preferably by heat sealing, along the edges to form a substantially air-tight enclosure. The inventive concept, as mentioned hereinbefore, relates to a unique opening means for the bag, and toward this end a tear line 12' composed of reknit serrations, or perforations, is arranged near one end of the bag. The location of tear line 12' is readily identifiable by means of a colored area 14, extending the entire length of the line, said tear line being in the mid-region thereof. The attention of the bag user is directed to the manner of opening the bag—by tearing along the tear line 12'—by means of one or more printed instruction areas 16 adjacent the linear colored area 14.

Serrations 12 are prepared in a manner which avoids destruction of the air-tight qualities of the film. This is accomplished by applying pressure to the area of the film having the serrated line 12', after the serrations have been made, and prior to formation of the bag from the film.

The illustrations in FIGS. 3 to 6 show in greater detail, the manner in which the invention is realized. A roll of plastic film 18, preferably polyethylene, although other types may be satisfactory, is fed through strip printing rolls 20 adapted to lay down a continuous line of ink 14 and to simultaneously print the instruction areas 16. After printing, the film 18 is moved through a drying area 22, following which it is fed through a serrating or perforating roller 24, which forms serrations, or perforations 12— about ⅜₄" in length—in a continuous line in the film, and about midway in the colored line of ink 14. The area of the material having the perforated line is then passed through pressure rollers 26, which, in effect, cause a reknitting, or a reweld, of the perforations 12 to form the line 12' of reduced tear resistance.

The ink line 14 serves a dual purpose, namely, to provide easy identification of the location of the tear line 12', and to provide a high point so that the pressure of the rollers 26 will be more directly applied to the serrations 12, to achieve the desired reknitting of the serrations. The heat "build-up" in the serrating roller 24, may assist, more or less, in the reknit of the serrations 12, to form the tear line 12'.

After the film 18 thus processed, i.e., printing of instruction areas 16 and ink line 14, as well as formation of tear line 12', it may be re-rolled for eventual use in a package making, or wrapping machine, or it may be directly fed into such a machine for immediate use.

It will be found that a tear line 12' made in accordance with the principles of the invention will achieve the objectives set forth hereinbefore.

The foregoing description has been given in detail without thought of limitation since the inventive principles involved are capable of assuming other forms without departing from the spirit of the invention or the scope of the following claims.

What is claimed is:

1. A tear line in a sheet of plastic film which may be formed by a combination of pressure and heat without the need for additional fill material comprising: an elongated printed area extending across said sheet of plastic film for providing a portion of said sheet of plastic film with a thickness greater than the thickness of a layer of said sheet plastic film and a plurality of serrations formed in the region of said printed area, whereby a high point is provided across said portion of said sheet of plastic film so that pressure applied to said tear line is more directly applied to said serrations to reknit said serrations to provide a substantially air-tight tear line.

2. A tear line in a sheet of heat sealable polymeric film which may be formed by a combination of pressure and heat without the need for additional fill material comprising: an elongated printed area extending across said sheet of plastic film for providing a portion of said sheet of plastic film with a thickness greater than the thickness of a layer of said sheet of plastic film and a plurality of serrations formed in the region of said printed area, whereby a high point is provided across said portion of said sheet of plastic film so that pressure applied to said tear line is more directly applied to said serrations to reknit said serrations to provide a substantially air-tight tear line.

(References on following page)

References Cited by the Examiner

UNITED STATES PATENTS

| | | | |
|---|---|---|---|
| 2,189,431 | 2/40 | Moore. | |
| 2,334,381 | 11/43 | Bronander | 93—1 |
| 2,554,137 | 5/51 | Burton | 229—51 |
| 2,790,594 | 4/57 | Hultkrans et al. | 229—87 |
| 2,973,131 | 2/61 | Mead et al. | 229—66 |
| 3,038,651 | 6/62 | Cloudsley | 229—66 |
| 3,045,891 | 7/62 | Alvarez | 229—69 |
| 3,088,379 | 5/63 | Dickinson et al. | 93—1 |

FOREIGN PATENTS 625,351  6/49  Great Britain.

FRANKLIN T. GARRETT, *Primary Examiner.*